(12) United States Patent
Yano et al.

(10) Patent No.: US 11,927,463 B2
(45) Date of Patent: Mar. 12, 2024

(54) MEASUREMENT SYSTEM, MEASUREMENT DEVICE, AND MEASUREMENT METHOD TO DETECT A DIRECTION IN WHICH FLUID FLOWS

(71) Applicant: NEC Corporation, Tokyo (JP)

(72) Inventors: Yutaka Yano, Tokyo (JP); Eitaro Misumi, Tokyo (JP); Makoto Saitoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 3 days.

(21) Appl. No.: 17/777,665

(22) PCT Filed: Aug. 25, 2020

(86) PCT No.: PCT/JP2020/031944
§ 371 (c)(1),
(2) Date: May 18, 2022

(87) PCT Pub. No.: WO2021/100274
PCT Pub. Date: May 27, 2021

(65) Prior Publication Data
US 2023/0043442 A1   Feb. 9, 2023

(30) Foreign Application Priority Data
Nov. 20, 2019   (JP) .................................. 2019-209868

(51) Int. Cl.
*G01D 5/353* (2006.01)
*G01F 1/32* (2022.01)
(Continued)

(52) U.S. Cl.
CPC ....... *G01D 5/35358* (2013.01); *G01F 1/3209* (2013.01); *G01F 1/661* (2013.01); *G01H 9/004* (2013.01)

(58) Field of Classification Search
CPC ........ G01F 1/3209; G01F 1/325; G01F 1/661; G01H 9/004; G01P 5/01; G01P 13/00; G01D 5/35358; G01D 5/35361
See application file for complete search history.

(56) References Cited

U.S. PATENT DOCUMENTS 4,706,502 A * 11/1987 Jones ....................... G01F 1/325
                                                                 73/861.24
9,909,984 B2 * 3/2018 Yang ..................... G01N 33/497

FOREIGN PATENT DOCUMENTS

CN   102128653 A  *  7/2011
CN   102128653 A      7/2011
(Continued)

OTHER PUBLICATIONS

International Search Report for PCT Application No. PCT/JP2020/031944, dated Nov. 17, 2020.
(Continued)

*Primary Examiner* — Justin N Olamit
(74) *Attorney, Agent, or Firm* — Sughrue Mion, PLLC

(57) ABSTRACT

A measurement system, a measurement device, and a measurement method being able to measure a flow speed for each position of an optical fiber are provided. According to one example embodiment, a measurement system includes: an object provided in a fluid, and generating a self-excited vibration by the fluid; an optical fiber provided in the fluid, and detecting the vibration; a light source outputting light P to the optical fiber; an acquisition unit acquiring backscattered light generated from the light P in the optical fiber and including a pattern indicating the vibration in a vibration position on the optical fiber to which the vibration of the fluid is transmitted; and a measurement unit measuring, from a pattern included in the backscattered light and indicating the vibration, a flow speed of the fluid in the vibration position.

8 Claims, 10 Drawing Sheets

(51) Int. Cl.
    *G01F 1/661* (2022.01)
    *G01H 9/00* (2006.01)

(56) References Cited

FOREIGN PATENT DOCUMENTS

| JP | S5528024 B1 | 7/1980 |
|---|---|---|
| JP | S58-191923 A | 11/1983 |
| JP | S59-111016 A | 6/1984 |
| JP | S59-148835 A | 8/1984 |
| JP | H06-088737 A | 3/1994 |
| KR | 20050064695 A * | 6/2005 |

OTHER PUBLICATIONS

R Posey Jr. et al., "Strain Sensing based on coherent Rayleigh scattering in an optical fibre", Electronics Letters, Sep. 28, 2000, vol. 36, No. 20, pp. 1688-1689.
JP Office Action for JP Application No. 2023-059971, dated Aug. 8, 2023 with English Translation.

* cited by examiner

MEASUREMENT SYSTEM, MEASUREMENT DEVICE, AND MEASUREMENT METHOD TO DETECT A DIRECTION IN WHICH FLUID FLOWS

This application is a National Stage Entry of PCT/JP2020/031944 filed on Aug. 25, 2020, which claims priority from Japanese Patent Application 2019-209868 filed on Nov. 20, 2019, the contents of all of which are incorporated herein by reference, in their entirety.

TECHNICAL FIELD

The present invention relates to a measurement system, a measurement device, and a measurement method, and particularly relates to a measurement system, a measurement device, and a measurement method that measure a flow speed of a fluid.

BACKGROUND ART

<Flow Speed Measurement Using Fluid Self-Excited Vibration>

A phenomenon where a vibration is generated when a columnar object is placed in a fluid has been known, and a Karman's vortex vibration has been known as a representative generation mechanism. It has been known that this is caused by a regular Karman's vortex street being formed on a downstream side from the columnar object, and a property of the following relational expression is provided.

Vibration frequency f=St U/d, with flow speed U, cable diameter d, and Strouhal number St In this way, a flow speed can be determined from a vibration frequency, thereby also resulting in application as a flowmeter.

An electric circuit element is generally used as a sensor that detects the vibration, but a method of performing detection by an optical fiber interferometer is also disclosed.

For example, Patent Literature 1 describes that a flow speed of a fluid is derived by acquiring a vibration frequency of a vibration generated in an optical fiber. Specifically, an optical signal being output from a light source is branched, and one of the branched optical signals is caused to be incident on an optical fiber disposed in a fluid. Then, transmitted light acquired from the incident light being transmitted through the optical fiber interferes with the other branched optical signal, and thus an interference signal is generated. By an analysis of the interference signal, a vibration frequency is acquired, and a flow speed of the fluid is derived.

<Optical Fiber Vibration Sensing>

Meanwhile, a technique of modulating light transmitted through an optical fiber by applying a sound wave and adding a vibration to the optical fiber, and monitoring a sound and a vibration at a remote place by detecting the reflected light or the transmitted light has been known (for example, Patent Literature 2 and Non Patent Literature 1). In recent years, such a sensor system is generally called distributed acoustic sensing (DAS). An optical fiber sensor does not need power supply, and electric wiring is unnecessary since a detected signal is transmitted by light. Thus, there are characteristics in which a trouble due to an insulation failure does not occur, a lightning strike does not have an influence, induction noise is less likely to be received, and the like.

An optical fiber sensor system of today is constituted of an optical fiber that senses a sound and a vibration, and a detection unit called an interrogator. The interrogator means a "person who makes an inquiry", and applies probe light to an optical fiber, receives reflected light or transmitted light from the optical fiber, and detects a state of a sound wave and a vibration acting on the optical fiber.

Since the DAS using distributed reflected light from an optical fiber is an improved model of increasing an analyzing skill of optical time domain reflectometry (OTDR), where and how much vibration is generated on an optical fiber can be determined from a reciprocating time of light (for example, Patent Literature 2).

CITATION LIST

Patent Literature

[Patent Literature 1] Japanese Unexamined Patent Application Publication No. H06-088737
[Patent Literature 2] Japanese Unexamined Patent Application Publication No. S59-148835

Non Patent Literature

[Non Patent Literature 1] R. Posey Jr., G. A. Johnson and S. T. Vohra, "Strain Sensing based on coherent Rayleigh scattering in an optical fibre", Electronics Letters, 2000, vol. 36, No. 20, pp. 1688-1689.

SUMMARY OF INVENTION

Technical Problem

In the method described in Patent Literature 1, an optical interferometer by transmitted light is used, and thus a flow speed for each position of an optical fiber cannot be measured.

In view of the circumstances, an object of the present development is to provide a measurement system, a measurement device, and a measurement method that are able to measure a flow speed for each position of an optical fiber.

Solution to Problem

A measurement system according to one example embodiment includes: an object provided in a fluid, and configured to generate a self-excited vibration by the fluid; an optical fiber provided in the fluid, and configured to detect the vibration; a light source configured to output light to the optical fiber; an acquisition unit configured to acquire backscattered light that is generated from the light in the optical fiber and includes a pattern indicating the vibration in a vibration position on the optical fiber to which the vibration of the fluid is transmitted; and a measurement unit configured to measure, from a pattern that is included in the backscattered light and indicates the vibration, a flow speed of the fluid in the vibration position.

A measurement device according to one example embodiment includes: an acquisition unit configured to acquire backscattered light that is generated from light being output to an optical fiber configured to detect a self-excited vibration by a fluid being generated from an object provided in the fluid and that includes a pattern indicating the vibration in a vibration position on the optical fiber to which the vibration of the fluid is transmitted; and a measurement unit configured to measure, from a pattern that is included in the backscattered light and indicates the vibration, a flow speed of the fluid in the vibration position.

A measurement method according to one example embodiment includes: a step of outputting light to an optical fiber configured to detect a self-excited vibration by a fluid being generated from an object provided in the fluid; a step of acquiring backscattered light that is generated from the light in the optical fiber and includes a pattern indicating the vibration in a vibration position on the optical fiber to which the vibration of the fluid is transmitted; and a step of measuring, from a pattern that is included in the backscattered light and indicates the vibration, a flow speed of the fluid in the vibration position.

Advantageous Effects of Invention

According to one example embodiment a measurement system, a measurement device, and a measurement method that are able to measure a flow speed for each position of an optical fiber can be provided.

BRIEF DESCRIPTION OF THE DRAWINGS

FIG. 11 is viewed from an optical fiber cable direction.

DESCRIPTION OF EMBODIMENTS

First Example Embodiment

Figure 1:
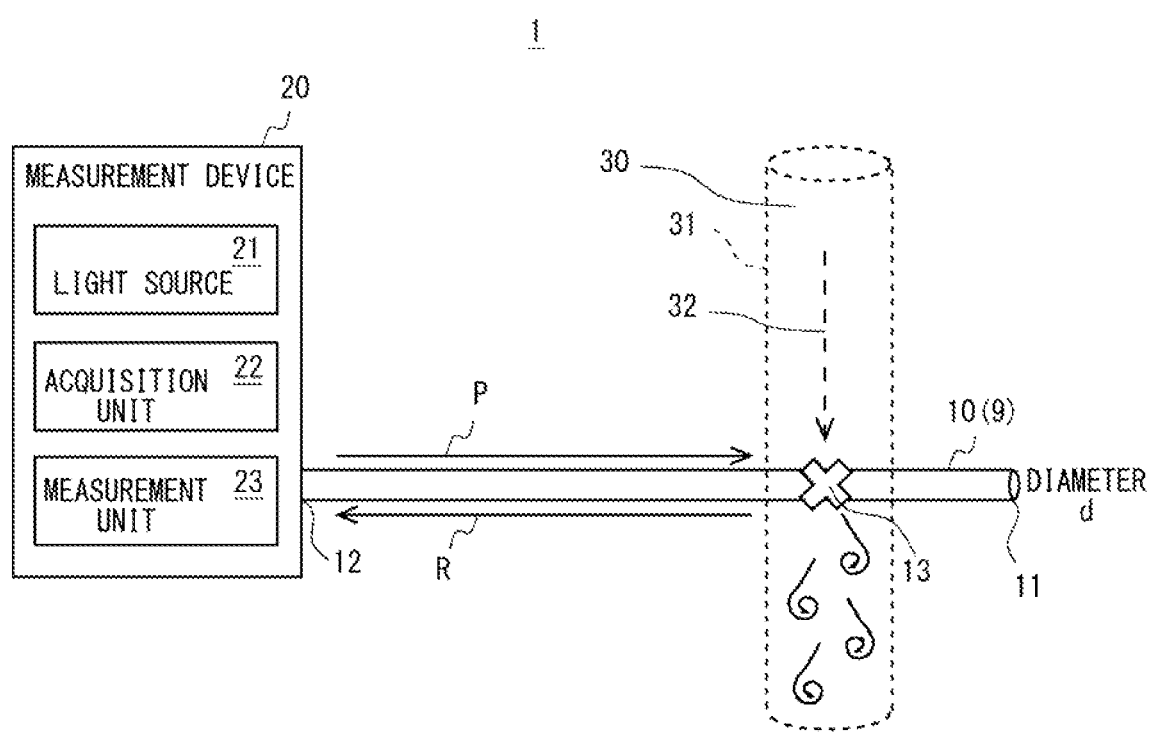
FIG. 1 is a configuration diagram illustrating a measurement system according to a first example embodiment.

A measurement system according to a first example embodiment will be described. FIG. 1 is a configuration diagram illustrating the measurement system according to the first example embodiment. As illustrated in FIG. 1, a measurement system 1 includes an optical fiber cable 10 in which an optical fiber 9 is wired and is appropriately covered therearound, and a measurement device 20. The optical fiber cable 10 has one end 11 and another end 12. The another end 12 of the optical fiber cable 10 is connected to the measurement device 20. The measurement device 20 includes a light source 21, an acquisition unit 22, and a measurement unit 23. The light source 21 may be provided outside the measurement device 20.

The light source 21 outputs light P from the another end 12 of the optical fiber cable 10 to the optical fiber 9. For example, the light source 21 outputs pulse light to the optical fiber 9. Note that the light source 21 may output light to which modulation is added to the optical fiber 9. The light P input to the optical fiber 9 travels toward the one end 11. When the light P travels in the optical fiber 9, backscattered light R is generated. The backscattered light R is, for example, Rayleigh scattered light. The backscattered light R travels toward the another end 12. The backscattered light R is also referred to as return light.

When the backscattered light R is generated from the light P at each point in the optical fiber 9, information about a place where the backscattered light is generated is added to the backscattered light R and returned to the another end 12. For example, when a position 13 of the optical fiber cable 10 is tapped, a vibration is transmitted to the optical fiber 9 passing through the optical fiber cable 10. Then, the backscattered light R generated in the position 13 includes a pattern indicating the vibration of the optical fiber 9. For example, the backscattered light R is subjected to a phase change in response to a vibration pattern. Note that a pattern of the backscattered light indicating a vibration is not limited to a phase change. An amplitude of a vibration, a cycle of a vibration, and the like may be included.

The acquisition unit 22 detects the return light. At this time, information about a place where the backscattered light is generated is extracted. By repeatedly performing the measurement, a vibration pattern of tapping is detected from the backscattered light from, for example, the position 13 of the optical fiber cable 10. In this way, in the measurement system 1, the optical fiber cable 10 functions as a sensor array in which vibration sensors are connected.

A position in the optical fiber 9 can be identified by a measurement principle of optical time domain reflectometry (OTDR). For example, provided that a fiber length from the measurement device 20 to the position 13 in which the vibration is provided is L, a time from when the light P is incident on the optical fiber 9 to when the backscattered light generated in the position 13 is returned is $2Ln/c$. Herein, c is a light speed in a vacuum, and n is a refractive index of the optical fiber.

Since a time from when the same light P is backscattered at a place shifted by $+\Delta L$ from the position 13 to when the light P is returned is $2(L+\Delta L)n/c$, a shift of a place appears as a time difference for the return light to be returned, and a distinction can be made.

Herein, the optical fiber cable 10 has a diameter d, and is placed in a fluid 30. A flow speed of the fluid 30 is U. The optical fiber cable 10 and a direction of a flow do not coincide with each other, and, for example, the fluid 30 flows in a direction 32 orthogonal to the optical fiber cable 10. Under such a condition, a vibration according to the flow speed U is generated in the optical fiber cable 10.

As a relationship between a vibration and a flow speed, for example, when the vibration is a Karman's vortex vibration, the following relational expression (1) is known with a vibration frequency f, a flow speed U, a diameter d of the optical fiber cable 10 that generates a Karman's vortex, and a Strouhal number St as described in the background art.

$$f = St \cdot U/d \quad (1)$$

In this way, the flow speed U can be acquired from the vibration frequency f. Note that a Karman's vortex vibration is a representative mechanism as a vibration phenomenon of an object placed in the fluid 30, but some other vibration mechanisms under a certain condition are known, and it is needless to say that the vibrations can also be measured in the present example embodiment.

It is preferable that a relationship between a flow speed and a vibration frequency is confirmed and calibrated in advance by soaking the optical fiber cable 10 to be actually used in the fluid 30 in which a flow speed is to be measured.

The vibration phenomenon in which a frequency changes according to a flow speed is measured by the vibration sensor array described above, and thus a vibration frequency at each point of the optical fiber cable 10 can be determined, and a flow speed can be measured.

For example, the fluid 30 may be housed in a flow tube 31 such as a pipe, or may be a part of the fluid 30 such as the sea, a lake, and a river. In the drawing, the optical fiber cable 10 extends in one direction, which is not limited thereto. The optical fiber cable 10 may include a curved portion.

When the optical fiber cable 10 is a submarine cable disposed on a sea bottom, the optical fiber cable 10 can be considered to partially float in a bridge shape with, as a fixed point, a portion in close contact with a sea bottom surface.

In this way, the measurement system 1 according to the present example embodiment includes: an object provided in the fluid 30, and configured to generate a self-excited vibration by the fluid 30; the optical fiber 9 provided in the fluid 30, and configured to detect the vibration; the light source 21 configured to output light to the optical fiber 9; the acquisition unit 22 configured to acquire backscattered light that is generated from the light in the optical fiber 9 and includes a pattern indicating the vibration in a vibration position on the optical fiber 9 to which the vibration of the fluid 30 is transmitted; and the measurement unit 23 configured to measure, from a pattern that is included in the backscattered light and indicates the vibration, a flow speed of the fluid 30 in the vibration position. Then, the optical fiber 9 configured to detect the vibration is an optical fiber core wire included in the optical fiber cable 10. Further, an object configured to generate a self-excited vibration by the fluid 30 is integrated as the optical fiber cable 10 including the optical fiber 9 configured to detect the vibration.

Figure 2:
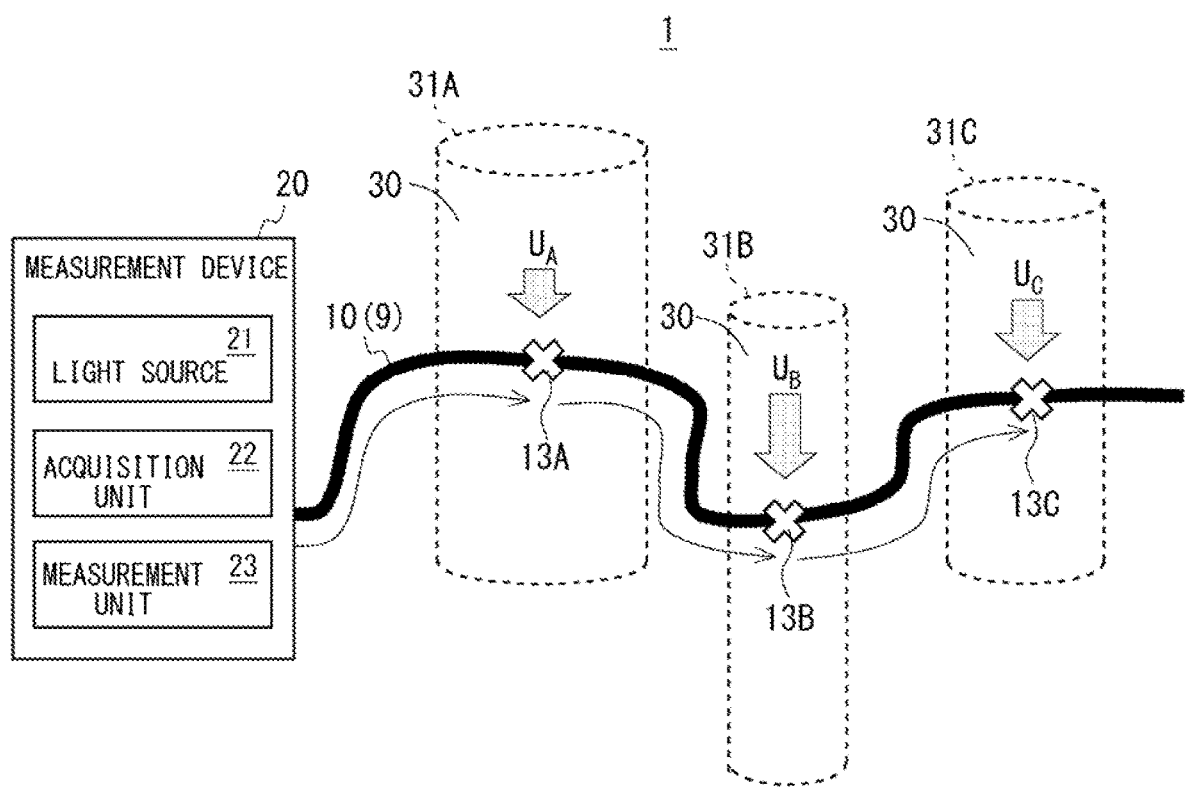
FIG. 2 is a configuration diagram illustrating an operation of measuring a flow speed at a plurality of places in the measurement system according to the first example embodiment.

Next, a fact that the measurement system 1 can simultaneously perform a measurement at a plurality of places will be described. FIG. 2 is a configuration diagram illustrating an operation of measuring a flow speed at a plurality of places in the measurement system according to the first example embodiment. As illustrated in FIG. 2, the optical fiber cable 10 passes through a plurality of flow tubes 31A, 31B, and 31C. Positions at the center of the tubes are 13A, 13B, and 13C, and optical fiber lengths from the light source 21 to the positions 13A, 13B, and 13C are L1, L2, and L3.

Flow speeds of the flow tubes 31A, 31B, and 31C are UA, UB, and UC (in the drawing, A, B, and C are indicated as subscripts). The optical fiber cable 10 vibrates at frequencies of fA, fB, and fC associated with the flow speeds in the positions 13A, 13B, and 13C.

The acquisition unit 22 repeatedly acquires the backscattered light R including a pattern indicating the vibrations.

The plurality of vibration positions 13A to 13C and a plurality of reception timings are associated with each other in advance as in Table 1 below.

TABLE 1

| VIBRATION POSITION | RECEPTION TIMING OF OPTICAL SIGNAL |
|---|---|
| VIBRATION POSITION 13A | t1 (= t0 + Δt1) |
| VIBRATION POSITION 13B | t2 (= t0 + Δt2) |
| VIBRATION POSITION 13C | t3 (= t0 + Δt3) |

In the vibration position 13A having the optical fiber length L1 from the measurement device 20, a reception timing of an optical signal is a time t1 (=t0+Δt1). Herein, a time t0 is a time at which the light source 21 outputs light. Further, time Δt1=2L1·n/c is satisfied.

Similarly, in the vibration position 13B having the optical fiber length L2 from the measurement device 20, a reception timing of an optical signal is a time t2 (=t0+Δt2). Herein, time Δt2=2L2·n/c is satisfied.

Similarly, in the vibration position 13C having the optical fiber length L3 from the measurement device 20, a reception timing of an optical signal is time t3 (=t0+Δt3). Herein, time Δt3=2L3·n/c is satisfied.

The acquisition unit 22 repeatedly acquires the backscattered light R including a pattern indicating each vibration in the plurality of vibration positions 13A to 13C. The measurement unit 23 detects the number of vibrations in each of the vibration positions 13A to 13C from a signal including a pattern indicating a vibration received at a timing being associated in advance, and calculates a flow speed of the fluid 30, based on the number of vibrations. In this way, the flow speeds UA, UB, and UC of the fluid 30 in the flow tubes 31A to 31C can be measured.

Figure 3:
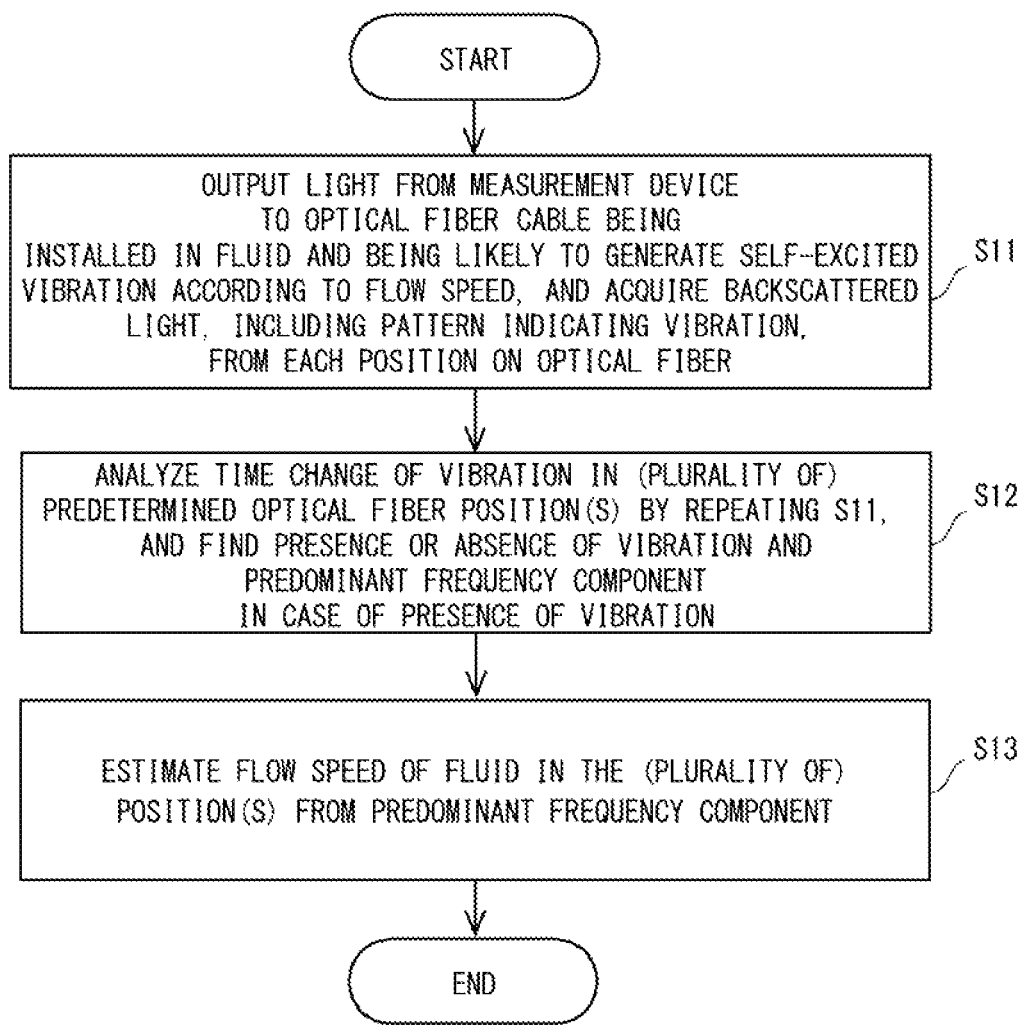
FIG. 3 is a flowchart diagram illustrating an operation of the measurement system according to the first example embodiment.

Next, a measurement method will be described as an operation of the measurement system according to the first example embodiment. FIG. 3 is a flowchart diagram illustrating the operation of the measurement system according to the first example embodiment. Herein, which position on an optical cable a measurement is to be performed on is assumed to be determined in advance.

As illustrated in step S11 in FIG. 3, the light source 21 outputs light to the optical fiber 9 that detects a self-excited vibration by the fluid 30 being generated from an object provided in the fluid 30. Next, the acquisition unit 22 acquires the backscattered light R, including a pattern indicating the vibration, from each position on the optical fiber 9.

Specifically, the acquisition unit 22 acquires the backscattered light R that is generated from the light P in the optical fiber 9 and includes a pattern indicating the vibration in each position on the optical fiber 9 through which the vibration of the fluid 30 propagates.

By repeating this measurement, a vibration waveform in each position on the optical fiber 9 is acquired (a vibration waveform at a place that does not vibrate is also acquired).

Next, as illustrated in step S13, the measurement unit 23 acquires, from a vibration waveform in a predetermined position on the optical fiber 9, a vibration frequency in the position, and further calculates a flow speed of the fluid 30.

Next, an effect of the measurement system 1 according to the present example embodiment will be described. Since an optical interferometer of transmitted light is used for detecting an optical phase change caused by a vibration in the measurement method described in Patent Literature 1, which portion of an optical fiber a phase change occurring in cannot be distinguished. On the other hand, since the measurement system 1 according to the present example embodiment detects a phase change of distributed reflected light similarly to OTDR, sensing for each place can be achieved, and a simultaneous measurement at a plurality of places as in FIG. 2 can be achieved.

Even when there are a plurality of measurement points of a vibration, only one measurement device 20 is necessary regardless of the number of the measurement points, and thus cost effectiveness can be further improved with an increase in the measurement points.

Second Example Embodiment

Figure 4:
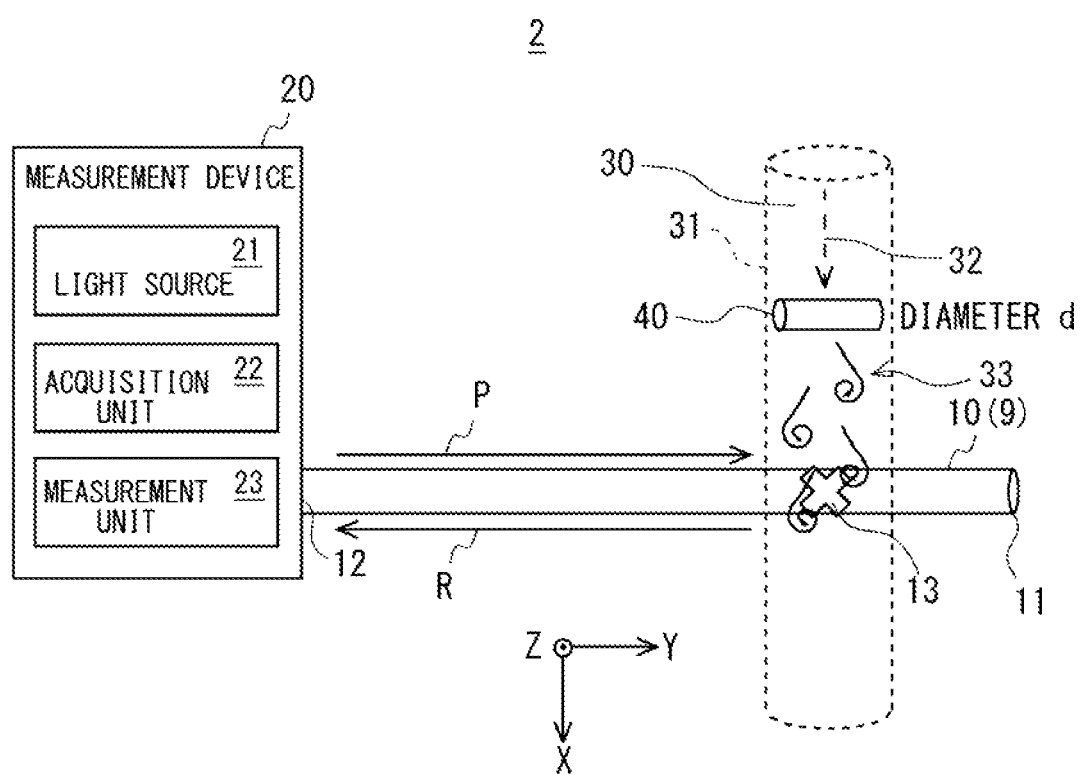
FIG. 4 is a configuration diagram illustrating a measurement system according to a second example embodiment.

Next, a measurement system according to a second example embodiment will be described. The present example embodiment is an example embodiment in which an object (a vibration generation body is expressed as a columnar object below) that generates a vibration in a fluid 30 is prepared separately from an optical fiber cable 10, and the optical fiber cable 10 has only a function of sensing a vibration generated in the fluid 30. In other words, an object that generates a vibration in the fluid 30 and the optical fiber cable 10 including an optical fiber 9 that senses a vibration are separated. FIG. 4 is a configuration diagram illustrating the measurement system according to the second example embodiment. As illustrated in FIG. 4, in a measurement system 2 according to the present example embodiment, a columnar object 40 is provided in a position upstream from the optical fiber cable 10 in the fluid 30. In other words, the optical fiber cable 10 in the measurement system 2 is disposed downstream from the columnar object 40 in the fluid 30.

For example, it is assumed that an XYZ orthogonal coordinate axis system is introduced, the fluid 30 includes a portion flowing in an +X-axis direction, and the optical fiber cable 10 includes a portion extending in a Y-axis direction. The columnar object 40 has a cylindrical shape having a diameter d extending in the Y-axis direction, and is disposed on an −X-axis direction side (upstream side of a flow) of the optical fiber cable 10.

For example, when the columnar object 40 is disposed in the fluid 30, a Karman's vortex 33 is generated downstream from the columnar object 40. Therefore, the Karman's vortex 33 comes into contact with the optical fiber 9 disposed downstream from the columnar object 40, and a vibration is generated. Similarly to the first example embodiment, a flow speed of the fluid 30 can be determined from the diameter d and a vibration frequency of the columnar object 40. In this case, a Karman's vortex generated in the optical fiber cable 10 is unnecessary, and thus a shape or a diameter in which the Karman's vortex is not generated is set, or a cycle different from a cycle of the Karman's vortex generated in the columnar object 40 is at least set, and the cycle is determined in advance and excluded from an analysis.

Also in the present disclosure, similarly to FIG. 2 in the first example embodiment, it is needless to say that a flow speed at a plurality of places on the optical fiber cable 10 can be simultaneously measured. Further, the columnar object 40 is not limited to a cylindrical shape, and may be a columnar shape having a cross section having, for example, an elliptical shape, a rectangular shape, a triangular shape, and the like instead of a circular shape.

In the two example embodiments described above, two basic configurations of the configuration (example embodiment 1) in which an object that generates a vibration according to a flow speed and the optical fiber cable 10 serving as a vibration sensor are integrated and the configuration (example embodiment 2) in which a fluid vibration generation body is separately prepared and the optical fiber cable 10 has a function of only vibration sensing are described. A way of thinking of the two configurations is general knowledge in a flow speed measurement technique using a Karman's vortex, and is also described in claim 2 and claim 3 in Patent Literature 1, for example.

Third Example Embodiment

In the first and second example embodiments described above, an absolute value of a flow speed can be measured, but an orientation cannot be measured. Thus, an example embodiment in which an orientation can also be measured will be described below.

A measurement system according to a third example embodiment will be described. The present example embodiment is a configuration in which an object that generates a vibration according to a flow speed and a sensor are integrated, and corresponds to an example embodiment in which an orientation can also be measured in addition to the first example embodiment.

Figure 5:
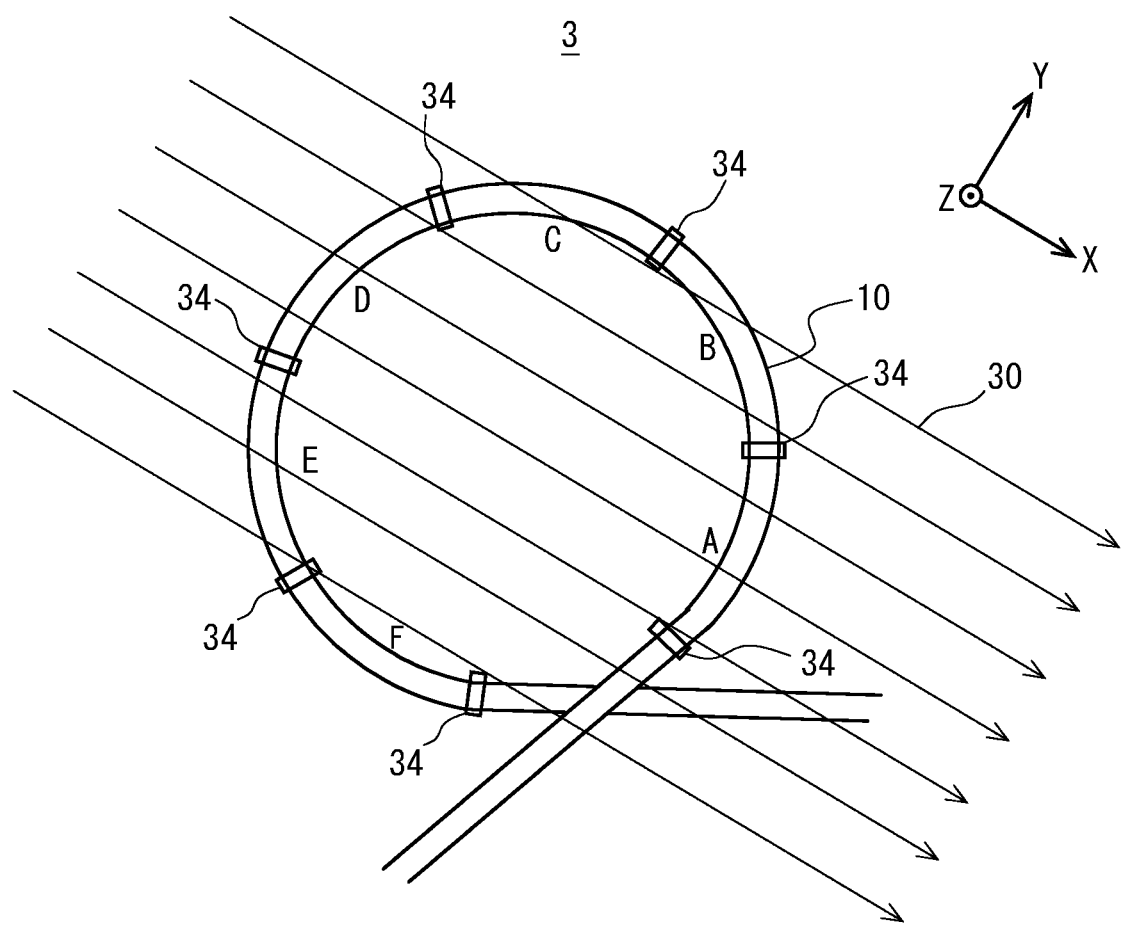
FIG. 5 is a diagram illustrating a configuration of an optical fiber cable in a measurement system according to a third example embodiment.

FIG. 5 is a diagram illustrating a configuration of an optical fiber cable in the measurement system according to the third example embodiment. An optical fiber cable 10 of a measurement system 3 according to the present example embodiment is installed in such a way as to make a circle in a plane parallel to a direction in which a fluid 30 flows. The optical fiber cable 10 is fixed by a plurality of holding points 34. A section from a holding point to a holding point is called A to F sections. Each of the sections is also referred to as a vibration detection section.

Herein, the direction in which the fluid 30 flows is assumed to be the X-axis direction. Two orthogonal directions in a plane orthogonal to the X-axis are assumed to be the Y-axis direction and the Z-axis direction.

For example, the optical fiber cable 10 is installed in such a way as to make a circle in a plane parallel to an XY plane. A vibration frequency detected in each of the sections A to F is illustrated in Table 2. The sections A and D indicate a stable vibration of approximately 12 to 13 [Hz]. Further, a vibration is not detected in the section F.

TABLE 2

| SECTION | VIBRATION FREQUENCY (Hz) |
|---|---|
| A | 13 |
| B | 4 |
| C | 2 |
| D | 12 |
| E | 4 |
| F | n.a. | n.a.: NO DETECTION OF VIBRATION

In this way, a measurement unit 23 can detect both of a direction of a flow of the fluid 30 and a flow speed from a vibration frequency at each point on the optical fiber cable 10. Specifically, it can be determined that the flow is a direction orthogonal to a cable orientation of the section A and the section D having the highest vibration frequency, and is a direction parallel to a cable orientation of the section F in which a vibration is not detected. Further, the flow speed can be calculated from the section A having the highest vibration frequency, similarly to the first example embodiment. By the method so far, positive and negative of an orientation of a flow cannot be recognized.

Note that, when a diameter of a circular shape of the optical fiber cable 10 is too short, there is a risk that a Karman's vortex generated in a cable on an upstream side may vibrate the optical fiber cable 10 on a downstream side. Thus, the diameter needs to be set large to some extent.

Further, when this phenomenon is actively used, an orientation of a flow can also be determined. For example, in the example in FIG. 5, the section A is located downstream from the section D, and thus it is assumed that a Karman's vortex generated in the section D comes into slight contact, and the same vibration of approximately 12 Hz as that observed in the section D is also superimposed and detected in addition to a vibration of approximately 13 Hz of the section A itself. As a result, it can be determined as a flow from the section D side toward the section A side. The information is not always acquired, and is acquired when a Z component of a flow is substantially zero.

In order to acquire the information, it is suitable to dispose the holding points 34 in such a way that sections do not have a relationship (a relationship in a mirror position) of line symmetry passing through the center. In FIG. 5, the holding points 34 are disposed in such a way that a circle is substantially divided into seven equal parts.

In this way, in the measurement system 3 according to the present example embodiment, the optical fiber cable 10 that detects a vibration is disposed in a plurality of directions, and thus has a plurality of vibration detection sections at different angles formed with a flow of the fluid 30, and the measurement unit 23 performs a comparison analysis on a vibration in each of the vibration detection sections, and also detects a direction in which the fluid 30 flows, based on a comparison result.

According to the measurement system 3 of the present example embodiment, an optical fiber 9 can measure, by 360°, a direction in which the fluid 30 flows along a circumference of a circular shape. A configuration, an operation, and an effect other than that are included in the description of the first to second example embodiments.

Modification Example

Figure 6:
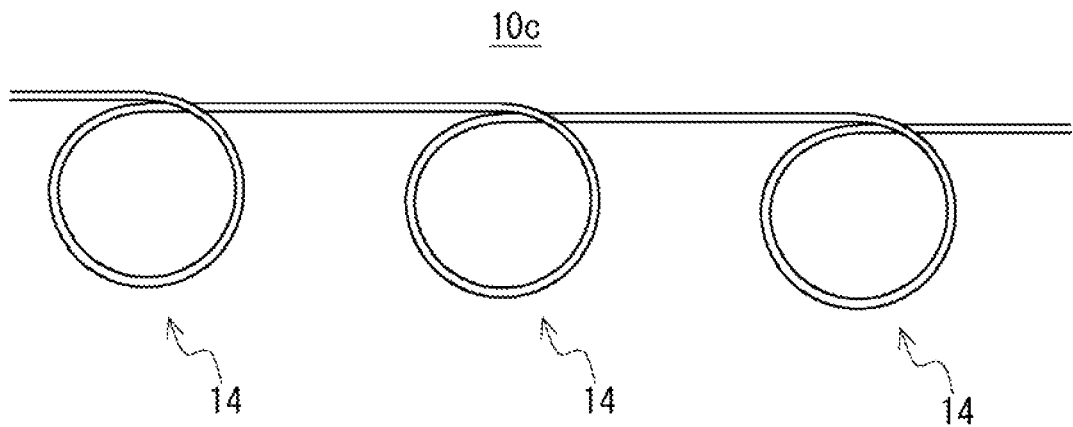
FIG. 6 is a diagram illustrating a configuration of an optical fiber cable in a measurement system according to a modification example of the third example embodiment.
Figure 7:
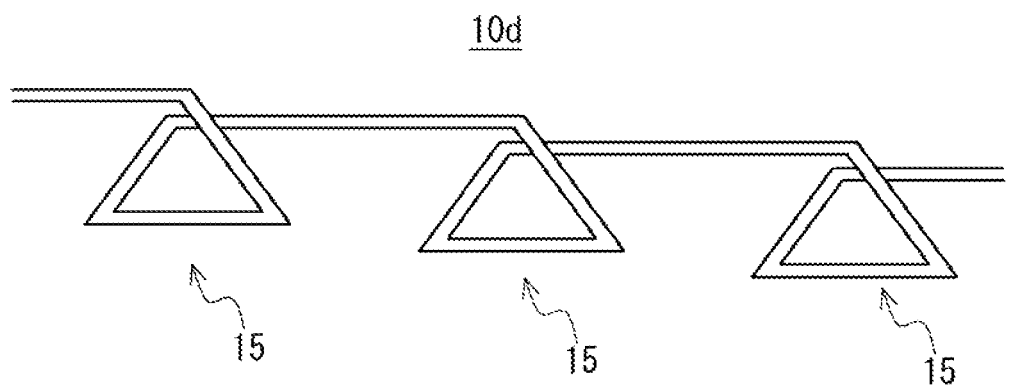
FIG. 7 is a diagram illustrating a configuration of an optical fiber cable in a measurement system according to a modification example of the third example embodiment.
Figure 8:
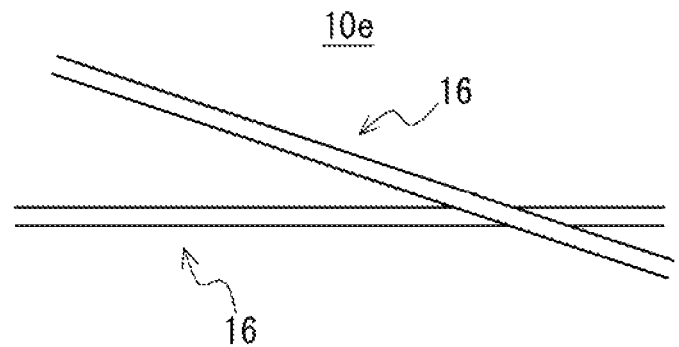
FIG. 8 is a diagram illustrating a configuration of an optical fiber cable in a measurement system according to a modification example of the third example embodiment.

Next, a measurement system according to a modification example of the third example embodiment will be described. The present modification example is a variation of a shape of an optical fiber. FIGS. 6 to 8 are diagrams each illustrating a configuration of an optical fiber cable in the measurement system according to the modification example of the third example embodiment.

As illustrated in FIG. 6, an optical fiber cable 10c is formed by connecting a plurality of circular portions 14 being curved into a circular shape. The circular portion 14 functions as a sensor that detects all directions in a plane parallel to a circle formed by the circular portion 14. Thus, the plurality of circular portions 14 are disposed in the fluid 30, and thus a distribution in a direction in which the fluid 30 flows can be measured. Note that circles formed by the plurality of circular portions 14 may face in the same direction or may face in different directions.

As illustrated in FIG. 7, an optical fiber cable 10d is formed by connecting a plurality of triangular portions 15 being bent into a triangular shape. The plurality of triangular portions 15 are disposed in the fluid 30, and thus a distribution in a direction in which the fluid 30 flows can be measured.

Particularly, sensitivity in a direction orthogonal to a side of a triangle formed by the triangular portion 15 can be improved. Note that triangles formed by the plurality of triangular portions 15 may face in the same direction or may face in different directions.

As illustrated in FIG. 8, an optical fiber cable 10e may include a plurality of extending portions 16 extending in any direction. The plurality of extending portions 16 may be the same optical fiber cable 10e or may be different optical fiber cables 10e. The plurality of extending portions 16 are disposed in the fluid 30, and thus a distribution in a direction in which the fluid 30 flows can be measured.

Fourth Example Embodiment

A measurement system according to a fourth example embodiment will be described. The present example embodiment is a configuration in which an object that generates a vibration according to a flow speed and a sensor are separated, and corresponds to an example embodiment in which an orientation can also be measured in addition to the second example embodiment.

Figure 9:
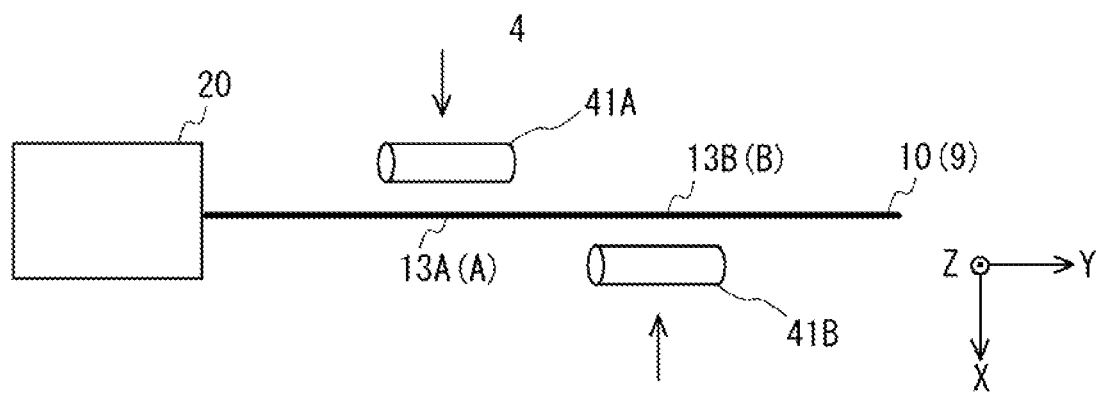
FIG. 9 is a diagram illustrating a configuration of an optical fiber cable and a columnar object in a measurement system according to a fourth example embodiment.

FIG. 9 is a diagram illustrating a configuration of an optical fiber cable and a columnar object in the measurement system according to the fourth example embodiment. For an optical fiber cable 10 of a measurement system 4 according to the present example embodiment, columnar objects 41A and 41B are disposed at two places across the optical fiber cable 10, and are displaced from each other in such a way that places where a Karman's vortex generated at the two places comes into contact with the optical fiber cable 10 are different.

In this way, a position 13A of an optical fiber 9 facing the +X-axis direction side of the columnar object 41A receives a vibration for a flow of the fluid 30 in the +X-axis direction, and a position 13B of the optical fiber 9 receives a vibration for a flow in the −X-axis direction, and thus an orientation of a flow of the fluid 30 can be recognized. As described in the second example embodiment, a flow speed can be determined from a vibration frequency. In this way, in the measurement system 4 according to the present example embodiment, a plurality of objects that generate a self-excited vibration by the fluid 30 are installed around the optical fiber cable 10 that detects a vibration, in such a way that vibration detection sections are different from each other, and a measurement unit 23 also detects, from a vibration detection section, a direction in which the fluid 30 flows.

Figure 10:
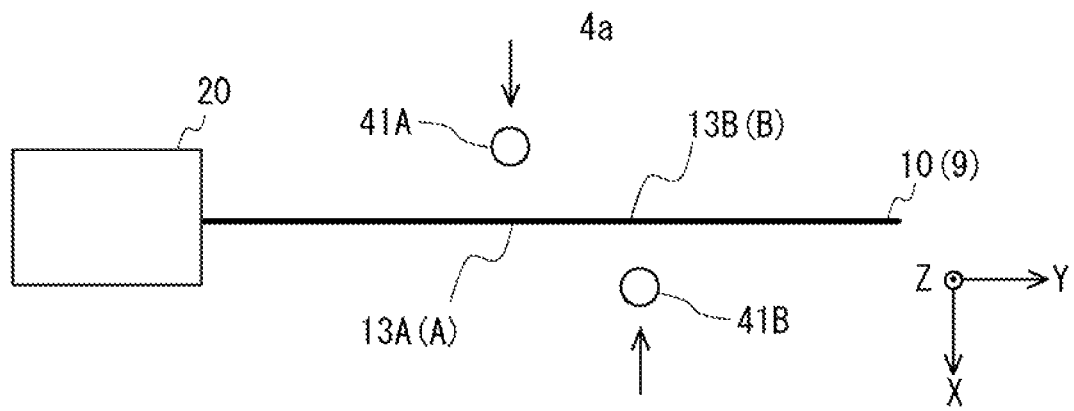
FIG. 10 is a diagram illustrating a configuration of an optical fiber cable and a columnar object in a measurement system according to a modification example of the fourth example embodiment.

Herein, orientations in a longitudinal direction of a columnar object and an optical fiber cable may not be the same and may be orthogonal to each other. A modification example of FIG. 9 is illustrated in FIG. 10. FIG. 10 is a diagram illustrating a configuration of an optical fiber cable and a columnar object in a measurement system according to a modification example of the fourth example embodiment. Herein, columnar objects 41A and 41B are illustrated in a state viewed from above.

In this way, a measurement unit 23 of a measurement system 4a measures a direction in which the fluid 30 flows from a positional relationship between the columnar objects 41A and 41B that are disposed near an optical fiber 9 and generate a vibration. A configuration, an operation, and an effect other than that are included in the description of the first example embodiment.

Figure 11:
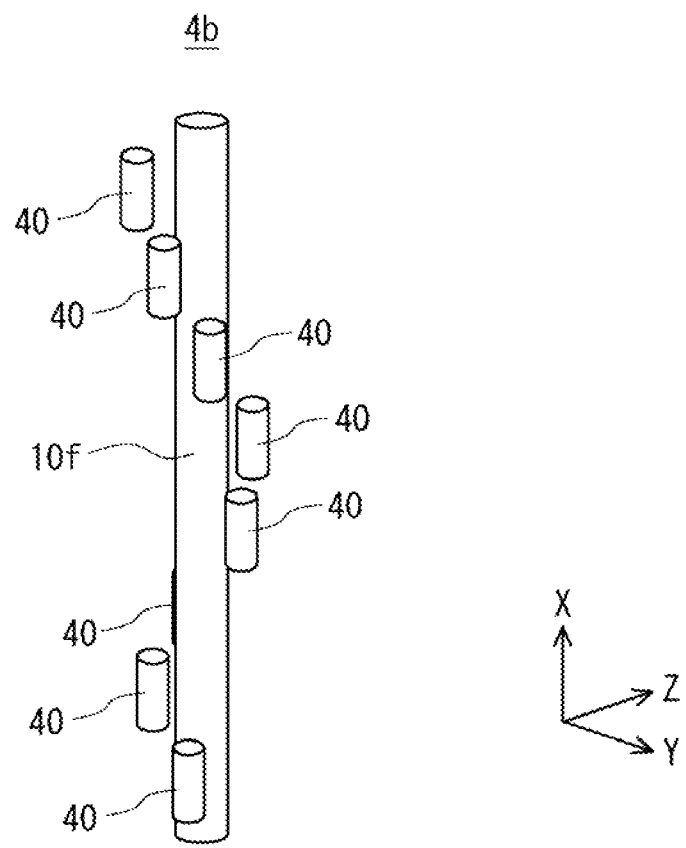
FIG. 11 is a diagram illustrating a configuration of an optical fiber cable and a columnar object in a measurement system according to another modification example of the fourth example embodiment.
Figure 12:
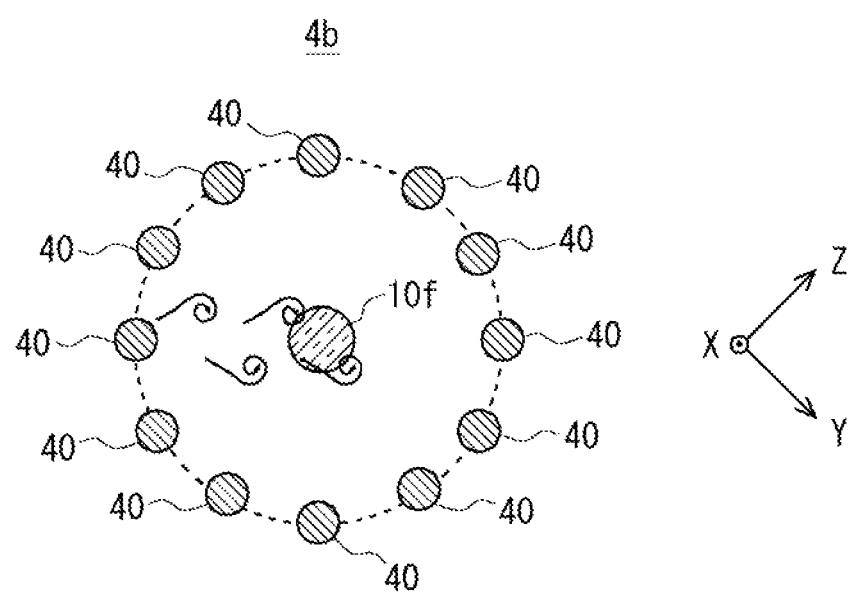
FIG. 12 is a diagram illustrating the configuration of the optical fiber cable and the columnar object in the measurement system according to the another modification example of the fourth example embodiment, and is a top view when

Another modification example of FIG. 9 according to the fourth example embodiment is illustrated in FIGS. 11 and 12. FIG. 11 is a diagram illustrating a configuration of an optical fiber cable and a columnar object in a measurement system according to another modification example of the fourth example embodiment. FIG. 12 is a top view when FIG. 11 is viewed from an optical fiber cable direction. FIGS. 11 and 12 are examples in which the number of detection directions, which is two directions in FIGS. 9 and 10, is increased to 12 directions.

As illustrated in FIGS. 11 and 12, in a measurement system 4b, 12 columnar objects 40 are disposed in such a way as to surround an optical fiber cable 10f extending in the X-axis direction. When viewed from the X-axis direction, the plurality of columnar objects 40 are annularly disposed around the optical fiber cable 10f as the center. Further, the plurality of columnar objects 40 are disposed in positions in the X-axis direction being displaced in such a way that positions in which a Karman's vortex generated in the columnar objects comes into contact with the optical fiber cable 10 do not overlap each other. For example, the plurality of columnar objects 40 are spirally disposed around the optical fiber cable 10f. Note that an arrangement of the plurality of columnar objects 40 is not limited to a spiral shape, and an arrangement in the X-axis direction may be irregular as long as the optical fiber cable 10f is surrounded when viewed from the X-axis direction.

In the present modification example, a measurement unit 23 can determine a direction in which the fluid 30 flows, based on a position on the optical fiber cable that detects a vibration, and can recognize a flow speed from a vibration frequency.

In a plane orthogonal to a direction in which the optical fiber cable 10 extends, a direction in which the fluid 30 flows can be measured by 360°. In this way, a flow speed of the fluid 30 can be measured with high accuracy. A configuration, an operation, and an effect other than that are included in the description of the first to fourth example embodiments.

Fifth Example Embodiment

Figure 13:
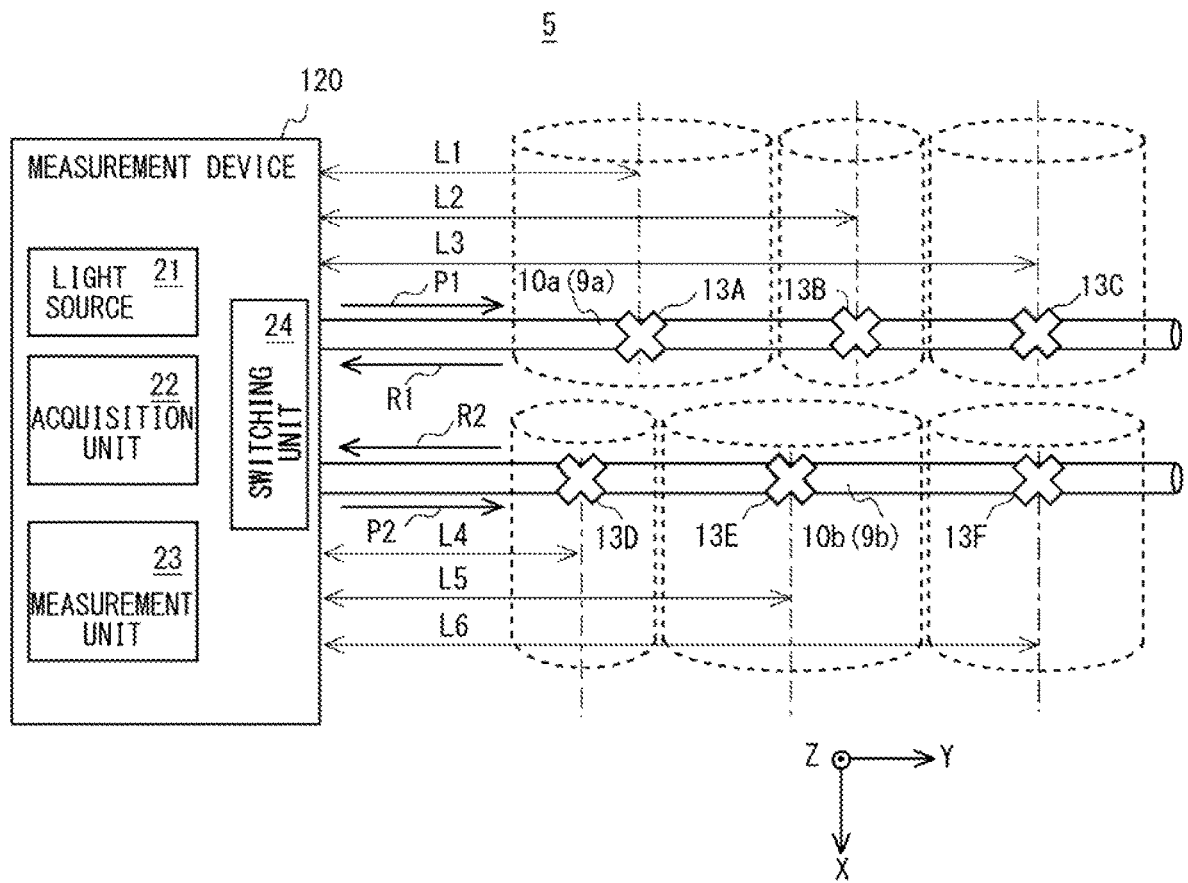
FIG. 13 is a configuration diagram illustrating a measurement system according to a fifth example embodiment.

In the example embodiments described above, the measurement device 20 and the optical fiber cable 10 are connected in a one-to-one manner, but one measurement device 20 can also perform a measurement by using a 1:N light switching switch while a plurality of optical fiber cables take turns in terms of time. FIG. 13 is a configuration diagram illustrating a measurement system according to a fifth example embodiment.

As illustrated in FIG. 13, a measurement system 5 includes a plurality of optical fiber cables 10a and 10b, and a measurement device 120. In the drawing, the plurality of optical fiber cables 10a and 10b are disposed in parallel, which is not limited thereto. The plurality of optical fiber cables 10a and 10b may extend in directions different from each other, or may be curved. The optical fiber cables 10a and 10b include optical fibers 9a and 9b extending along a central axis inside the optical fiber cables 10a and 10b. The measurement system 5 measures a flow speed at a plurality of vibration positions 13A, 13B, and 13C in the optical fiber cable 10a and a plurality of vibration positions 13D, 13E, and 13F in the optical fiber cable 10b.

The measurement device 120 includes a switching unit 24 in addition to a light source 21, an acquisition unit 22, and a measurement unit 23. The switching unit 24 alternately switches a connection between the measurement device 120 and the optical fiber 9a or the optical fiber 9b at a predetermined timing. In this way, the measurement unit 23 can alternately perform a measurement of the switched optical fiber 9a or optical fiber 9b. When something that suddenly changes a flow speed does not occur, such an intermittent measurement is sufficient.

According to the measurement system 5 in the present example embodiment, one measurement device 120 can measure the plurality of optical fiber cables 10a and 10b, and thus a cost of the measurement device 120 in the entire measurement system can be reduced.

Further, the switching unit 24 can also be used for achieving a redundant configuration. When the plurality of optical fiber cables 10a and 10b are disposed in parallel for preparing for a trouble such as a break in the optical fiber cable 10 and the like, for example, the switching unit 24 can switch to a spare cable in an event of a failure and the like. Further, conversely, by preparing a plurality of the measurement devices 120, the switching unit 24 can also be configured to switch to a spare device in an event of a failure and the like. In this way, reliability can be increased without stopping an operation even for a failure. A configuration, an operation, and an effect other than that are included in the description of the first to fourth example embodiments.

Note that the present invention is not limited to the embodiments described above, and may be appropriately modified without departing from the scope of the present disclosure. For example, a measurement system, a measurement device, and a measurement method acquired by combining the configurations of the first to fifth example embodiments and the modification examples are also included within the scope of a technical idea.

Although the invention of the present application has been described with reference to the example embodiments, the invention of the present application is not limited to the above-described example embodiments. Various modifications that can be understood by those skilled in the art can be made to the configuration and the details of the invention of the present application within the scope of the invention.

This application is based upon and claims the benefit of priority from Japanese patent application No. 2019-209868, filed on Nov. 20, 2019, the disclosure of which is incorporated herein in its entirety by reference.

REFERENCE SIGNS LIST 1, 2, 3, 4, 4a, 4b, 5 Measurement system
9, 9a, 9b Optical fiber
10, 10a, 10b, 10c, 10d, 10e, 10f Optical fiber cable
11 One end
12 Another end
13, 13A, 13B, 13C Vibration position
14 Circular portion
15 Triangular portion
16 Extending portion
20 Measurement device
21 Light source
22 Acquisition unit
23 Measurement unit
24 Switching unit
30 Fluid
31, 31A, 31B, 31C Flow tube
32 Direction
33 Karman's vortex
34 Holding point
40, 41A, 41B Columnar object

What is claimed is:
1. A measurement system comprising:
an object provided in a fluid, and configured to generate a self-excited vibration by the fluid;

an optical fiber provided in the fluid, and configured to detect the vibration;

a light source configured to output light to the optical fiber;

a detector configured to acquire backscattered light that is generated from the light in the optical fiber and includes a pattern indicating the vibration in a vibration position on the optical fiber to which the vibration of the fluid is transmitted; and a calculator configured to measure, from a pattern that is included in the backscattered light and indicates the vibration, a flow speed of the fluid in the vibration position, wherein an object configured to generate a self-excited vibration by the fluid 1 s integrated as an optical fiber cable including the optical fiber configured to detect the vibration, wherein the optical fiber configured to detect the vibration is disposed in a plurality of directions, and thus has a plurality of vibration detection sections at different angles formed with a flow of the fluid, and wherein the calculator is configured to perform a comparison analysis on the vibration in each of the vibration detection sections, and to also detect a direction in which the fluid flows, using a comparison result.

2. The measurement system according to claim 1, wherein the optical fiber configured to detect the vibration is an optical fiber core wire included in an optical fiber cable.

3. The measurement system according to claim 1, further comprising a light switching switch located between the calculator and a plurality of optical fibers, wherein measurement is successively performed while switching the plurality of the optical fibers.

4. A measurement device comprising:

a detector configured to acquire backscattered light that is generated from light being output to an optical fiber configured to detect a self-excited vibration by a fluid being generated from an object provided in the fluid and that includes a pattern indicating the vibration in a vibration position on the optical fiber to which the vibration of the fluid is transmitted; and a calculator configured to measure, from a pattern that is included in the backscattered light and indicates the vibration, a flow speed of the fluid in the vibration position, wherein an object configured to generate a self-excited vibration by the 1 s integrated as an optical fiber cable including the optical fiber configured to detect the vibration, wherein the optical fiber cable is disposed in a plurality of directions, and thus has a plurality of vibration detection sections at different angles formed with a flow of the fluid, and wherein the calculator is configured to perform a comparison analysis on the vibration in each of the vibration detection sections, and also detects a direction in which the fluid flows, using a comparison result.

5. The measurement device according to claim 4, wherein the optical fiber configured to detect the vibration is an optical fiber core wire included in an optical fiber cable.

6. The measurement device according to claim 4, further comprising a light switching switch located between the calculator and a plurality of the optical fibers, wherein measurement is successively performed while switching the plurality of the optical fibers.

7. A measurement method comprising:

an operation of outputting light to an optical fiber configured to detect a self-excited vibration by a fluid being generated from an object provided in the fluid;

an operation of acquiring backscattered light that is generated from the light in the optical fiber and includes a pattern indicating the vibration in a vibration position on the optical fiber to which the vibration of the fluid is transmitted; and an operation of measuring, from a pattern that is included in the backscattered light and indicates the vibration, a flow speed of the fluid in the vibration position, wherein, in the operation of outputting light to the optical fiber, an object configured to generate a self-excited vibration by the fluid is integrated as an optical fiber cable including the optical fiber configured to detect the vibration, wherein, in the operation of outputting light to the optical fiber, the optical fiber cable is disposed in a plurality of directions, and thus has a plurality of vibration detection sections at different angles formed with a flow of the fluid, and wherein the operation of measuring a flow speed of the fluid includes performing a comparison analysis on the vibration in each of the vibration detection sections, and also detecting a direction in which the fluid flows, using a comparison result.

8. The measurement method according to claim 7, wherein, in the operation of outputting light to the optical fiber, the optical fiber configured to detect the vibration is an optical fiber core wire included in an optical fiber cable.

* * * * *